United States Patent
Lu et al.

(10) Patent No.: US 12,534,430 B2
(45) Date of Patent: Jan. 27, 2026

(54) MONOMER FOR POLYMER GEL, POLYMER GEL AND PREPARATION THEREFOR

(71) Applicant: SOOCHOW UNIVERSITY, Suzhou (CN)

(72) Inventors: Jianmei Lu, Suzhou (CN); Qingfeng Xu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 441 days.

(21) Appl. No.: 18/011,433

(22) PCT Filed: Feb. 1, 2021

(86) PCT No.: PCT/CN2021/074736
§ 371 (c)(1),
(2) Date: Jul. 1, 2023

(87) PCT Pub. No.: WO2022/160357
PCT Pub. Date: Aug. 4, 2022

(65) Prior Publication Data
US 2023/0365496 A1    Nov. 16, 2023

(51) Int. Cl.
C07C 305/24    (2006.01)
B01J 20/30     (2006.01)
C07C 303/24    (2006.01)
C07C 305/26    (2006.01)
C07F 7/18      (2006.01)

(52) U.S. Cl.
CPC .......... *C07C 305/26* (2013.01); *C07C 303/24* (2013.01); *C07F 7/1804* (2013.01); *C07F 7/188* (2013.01)

(58) Field of Classification Search
CPC . C07F 7/188; B01J 20/26; B01J 20/30; C07C 303/24
See application file for complete search history.

(56) References Cited

U.S. PATENT DOCUMENTS 5,041,516 A * 8/1991 Frechet ................ C08G 83/003
                                              424/DIG. 16
12,434,221 B2 * 10/2025 Lu ......................... C08G 75/24

FOREIGN PATENT DOCUMENTS

| CN | 112898571 A | 6/2021 | |
|---|---|---|---|
| CN | 113150024 A | 7/2021 | |
| EP | 3259050 B1 | 6/2020 | |
| JP | 2003335848 A | 11/2003 | |
| WO | WO-2015188120 A1 * | 12/2015 | ........... C07D 279/08 |

* cited by examiner

*Primary Examiner* — Alexander R Pagano
*Assistant Examiner* — Frank S. Hou
(74) *Attorney, Agent, or Firm* — SZDC Law PC

(57) ABSTRACT

Disclosed are a monomer for a polymer gel, a polymer gel and a preparation method therefor. The preparation method includes: reacting 4,4',4"-trihydroxytriphenylmethane with tert-butyldimethylchlorosilane to obtain TPC-OTBS; reacting 4,4',4"-trihydroxy triphenylmethane with sulfuryl fluoride in the presence of triethylamine to prepare TPC-OSO$_2$F; and dissolving the TPC-OTBS and TPC-OSO$_2$F in DMF, then adding DBU and ultrasonically dispersing same until uniform, and letting same stand to obtain a polymer gel. The gel obtained by the present invention can selectively adsorb an organic solvent by means of electrostatic interaction and Van der Waals force. The surface and internal morphologies of a solid material are characterized by SEM and TEM, in which the porous morphology of the solid material is found, and most of the pores are macropores.

5 Claims, 8 Drawing Sheets

MONOMER FOR POLYMER GEL, POLYMER GEL AND PREPARATION THEREFOR

This application is the National Stage Application of PCT/CN2021/074736, filed on Feb. 1, 2021, which is incorporated by reference for all purposes as if fully set forth herein.

TECHNICAL FIELD

The invention relates to material technology, and specifically relates to a polymer gel and a preparation method and application.

BACKGROUND TECHNIQUE

Polymer gel is a metastable equilibrium system formed by the interaction between gelling factor and solvent (water or other organic solvent) through hydrogen bonding, π-π stacking or van der Waals force and electrostatic attraction. It is favored for its wide application in chemical separation, environmental remediation, biomedicine and smart materials. Semi-solid organogels formed by the interaction of polymers and organic solvents are important basic materials for future all-solid-state electrolyte batteries and artificial muscles. However, how the polymer chains interact with liquid organic solvent molecules to stabilize them in the polymer framework has not been solved. This brings difficulties to the rational design of polymer gels. Although traditionally hydrogen bonding, van der Waals forces and electrostatic interactions have been assumed to be the determinants of gel stability.

Most polymer gel designs, however, focus on the formation of oil molecules (non-polar organic solvents), and the formation of colloids in polar organic solvents other than water and alcohols (such as DMF, DMSO) is rarely studied. This is mainly due to the difficulty of accurately predicting the interaction of solvent molecules with the main chain and side chain groups of the polymer, which can make the solvent molecules arrange in order and stabilize in the polymer. Therefore, theoretical and experimental study of the forces provide by different groups, accurate prediction of their interaction with polar solvent molecules, synergizing the advantages of various forces, achieving the effect of 1+1>2, and finally designing and preparing polymers-polar organic solvent adsorption gel, will provide new ideas and new materials for new environment-responsive smart materials (electrorheological, electroelastic stretchers, etc.).

Technical Problem

The present invention uses multi-functional groups (the number of functional groups is 3 or more) to prepare cross-linked polysulfate for the first time. The goal is to use a new method to synthesize polymer gels to explore the molecular interaction between them and organic solvents, providing new ideas for design polymer gels.

The chemical synthesis of the present invention is convenient, and the preparation of the multifunctional monomer is simple. First, 4,4',4''-trihydroxytriphenylmethane (TPC-OH) is selected as a phenolic precursor. Sulfuryl fluorination and siloxane etherification form trifunctional monomers TPC-OTBS and TPC-OSO$_2$F, respectively. Standing for the first time results a solvogel.

Technical Solutions

The present invention discloses the following technical solutions:

A polymer gel, its preparation method includes the following steps: TPC-OTBS, TPC-OSO$_2$F are dissolved in DMF, adding DBU, standing still, obtaining a polymer gel; specifically, the preparation method of the polymer gel is as follows: dissolving TPC-OTBS and TPC-OSO$_2$F in DMF, adding DBU, dispersing evenly, and standing at room temperature to obtain a polymer gel, which is called TPC-cPs-gel.

The present invention also discloses the application of the above polymer gel in adsorbing organic solvents.

The present invention also discloses a method for adsorbing an organic solvent by using the polymer gel, including the following steps: placing the polymer gel into an organic solvent or a solution containing an organic solvent to complete the adsorption of the organic solvent.

In the present invention, the solution containing an organic solvent can be a mixed solution of an organic solvent and water; the organic solvent can be a single organic solvent or a mixed organic solvent, including DMF, DMSO, DMA, NMP, benzaldehyde, cyclohexanone, etc.

In the present invention, a ratio of TPC-OSO$_2$F, DMF and DBU is (190-210 mg): (1-4.5 mL): 50 μg; a molar ratio of TPC-OSO$_2$F and TPC-OTBS is 1:(0.9-1.1). Preferably, molar amounts of TPC-OSO$_2$F and TPC-OTBS are the same.

A typical process for synthesizing the TPC-cPS-gel of the present invention is as follows: weighing a certain amount of TPC-OSO$_2$F and TPC-OTBS in a sample bottle, using a pipette to measure DMF and adding it to the sample bottle as a solvent, dissolving all solids by ultrasound, adding DBU, sonicating again to dissolve and disperse evenly, letting the sample bottle stand for reaction, observing the fluidity of the solution by a tilting method and the formation of gel being seen (conventional technology), pouring off an upper layer of liquid, and removing the lower layer of gel, which is TPC-cPS-gel. The specific steps of dissolving, dispersing, dropping and feeding involved in the present invention are all conventional techniques in the art.

In the present invention, the chemical structural formulas of TPC-OTBS and TPC-OSO$_2$F are.

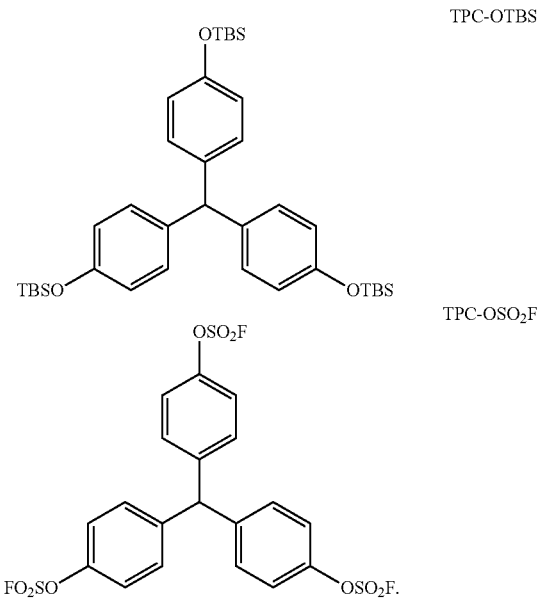

In the present invention, in the presence of imidazole, 4,4',4"-trihydroxytriphenyl-methane is reacted with tert-butyldimethylsilyl chloride to prepare TPC-OTBS; further, a molar ratio of 4,4',4"-trihydroxytriphenylmethane, tert-butyldimethylsilyl chloride and imidazole is 1: (3-4): (3-4); and the reaction is carried out at room temperature.

In the present invention, in the presence of triethylamine, 4,4',4"-trihydroxytriphenyl-methane is reacted with sulfuryl fluoride to prepare TPC-OSO$_2$F; further, a molar ratio of 4,4',4"-trihydroxytriphenylmethane and triethylamine is 1: (3-4); and the reaction is carried out at room temperature.

Beneficial Effects

In the present invention, the multifunctional monomers TPC-OSO$_2$F and TPC-OTBS are synthesized, and the cross-linked polysulfate gel is chemically synthesized. The reaction at a certain concentration makes the cross-linked polysulfate form a polymer gel in the DMF solution. The obtained gel can be used to prepare solid porous organic polymer materials with abundant macropores by solvent exchange. The surface and internal morphology of the solid material are characterized by SEM and TEM. The porous morphology is found, and most of them are macropores. XRD, HR-TEM and TEM diffraction proved that the polymer is amorphous, and its pores may be formed by macroscopic gel bundle aggregation and solvent volatilization. The structure of the cross-linked polysulfate is characterized by IR and NMR, and the basic complete reaction of the monomeric sulfonyl fluoride groups is proved by solid NMR and XPS elements.

EMBODIMENTS OF THE PRESENT INVENTION

The prior art technology uses bifunctional monomers to synthesize long-chain biaryl polysulfate, and the use of multifunctional groups (the number of functional groups is 3 or more) to prepare cross-linked polysulfate has not been reported. The existing method uses multifunctional monomers as starting materials, and cannot obtain polymers with porous structures. It is gratifying that the present invention uses a new method to limit the formation conditions and directions of solvogels to obtain a solvent for cross-linked polysulfate gel. The reaction does not introduce metal ions, and has mild reaction conditions, high yield and few by-products. This work expands the synthetic methods and applications of polysulfate. The starting materials involved in the present invention were all commercially available products, and the specific operation methods and testing methods were conventional methods in the art. In the adsorption experiment, the solvent did not pass through the gel, and the swelling degree Q was the maximum adsorption multiple, using weight for calculation. Unless otherwise specified, the adsorbed solvent was a single solvent, specifically a conventional solvent adsorption experiment.

N,N-Dimethylformamide (DMF), tetrahydrofuran (THF), methanol, n-hexane, dichloromethane (DCM) and triethylamine (TEA) were purchased from Sinopharm Holding Group Co., Ltd. 4,4',4"-trihydroxytriphenylmethane was purchased from Shanghai Jiuding Chemical Technology Co., Ltd. Imidazole, tert-butyldimethylsilyl chloride (TBSCl), and 1,8-diazabicycloundecaheptaene (DBU) were purchased from Tishi Ai (Tokyo) Chemical Industry Development Co., Ltd. Sulfuryl fluoride gas was purchased from Hangzhou Maoyu Electronic Chemical Co., Ltd. All the above materials and reagents were used as received.

The $^1$H-NMR spectrum was measured using an INOVA 400 MHz high-resolution nuclear magnetic resonance spectrometer with tetramethylsilane (TMS) as the internal standard and CDCl$_3$ as the solvent. The $^{13}$C-NMR and $^{19}$F-NMR spectra were obtained by measuring 30-40 mg solid samples at room temperature by AVANCEIII/WB-400 solid wide-cavity superconducting nuclear magnetic resonance spectrometer. Infrared spectroscopy (FT-IR) was measured on a VERTEX 70 infrared spectrometer with a diamond ATR accessory. Scanning electron microscope (SEM) images were taken with a Hitachi S-4700 scanning electron microscope from Hitachi, Japan. TEM images were taken by FEI TECNAI G20 transmission electron microscope from FEI Company, USA. The XPS elemental analysis was tested by the EXCALAB 250 XI instrument of Thermo Fisher Scientific in the United States.

Example 1: Synthesis of TPC-OTBS

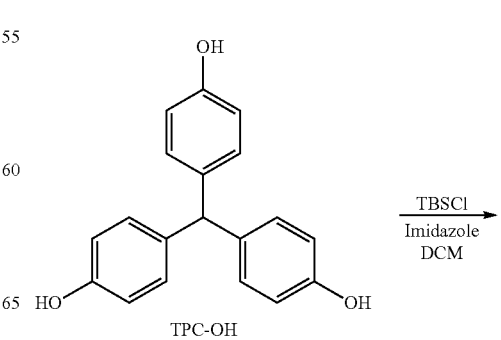

-continued

Figure 1:
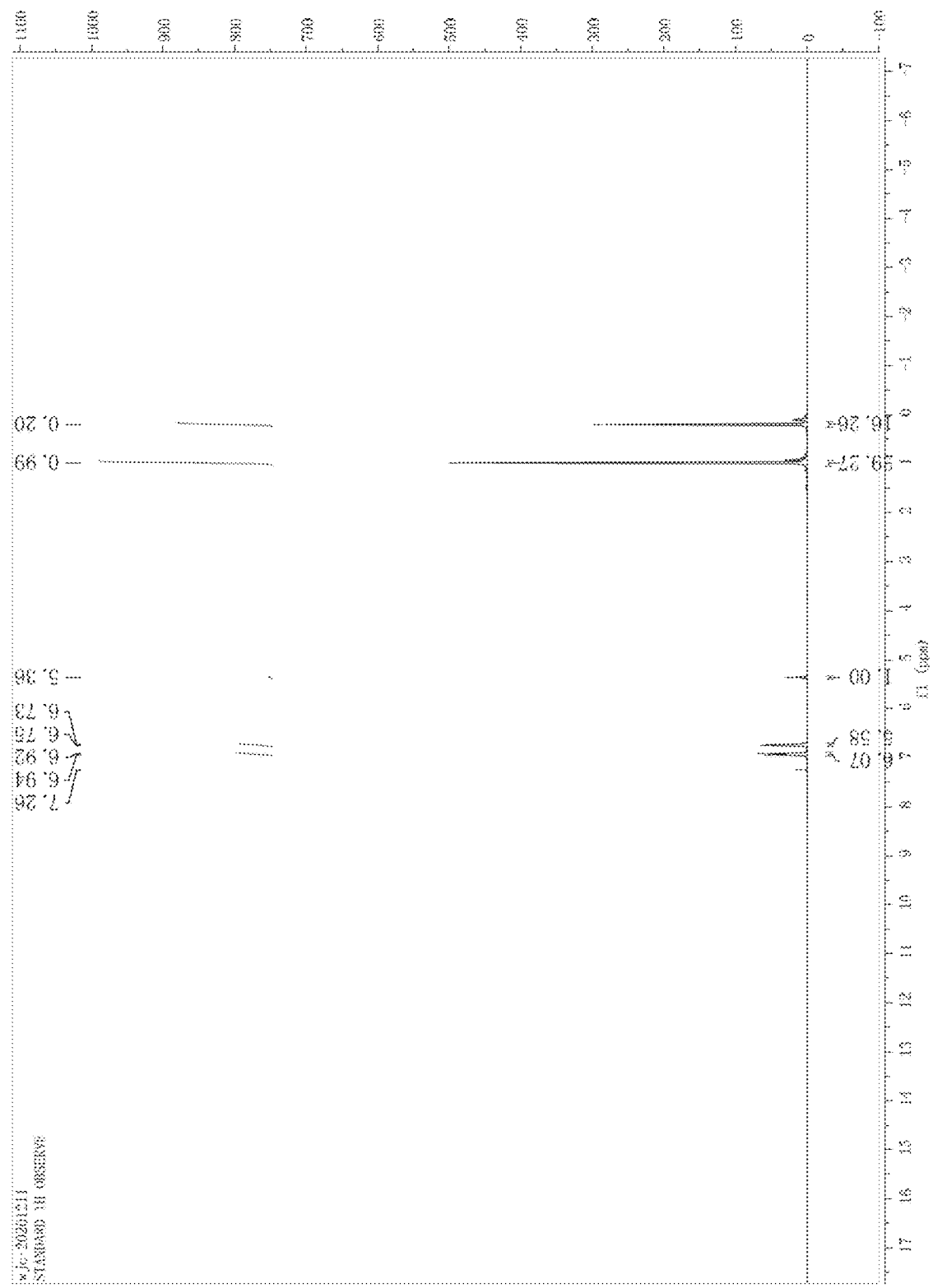
FIG. 1 shows the nuclear magnetic spectrum of TPC-OTBS.

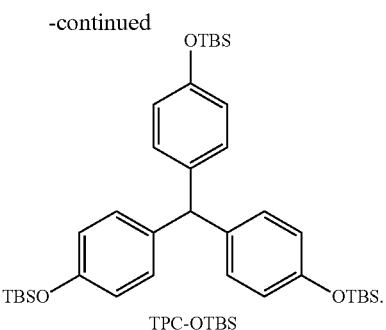
TPC-OTBS 4,4',4"-trihydroxytriphenylmethane (1.46 g, 5 mmol) and imidazole (1.36 g, 20 mmol) were placed in a 100 mL flask, 20 mL of dichloromethane was added, the mixture was stirred at room temperature for 15 minutes, and the solids were completely dissolved. Dissolving tert-butyldimethylsilyl chloride (3.02 g, 20 mmol) in 10 mL of dichloromethane, adding the solution dropwise to the above flask through a constant pressure dropping funnel, keeping stirring in the flask during dropwise addition, and completing the dropwise addition procession after 30 minutes. The reaction mixture was continued to stir at room temperature for 12 hours. The reaction progress was monitored by TLC. After the starting materials were converted, and the solid was removed by filtration. The filtrate was spin-dried and the crude product was purified by column chromatography. The developing solvent was dichloromethane/petroleum ether (v/v=1/2). The pure product was a pure white solid (2.3 g, yield: 72%) TPC-OTBS, TBS from tert-butyldimethylsilyl chloride (TBSCl). The nuclear magnetic spectrum of the synthesized product is shown in FIG. 1. $^1$H NMR (400 MHz, CDCl$_3$, ppm) δ 6.91 (d, J=8.0 Hz, 6H), 6.73 (d, J=8.1 Hz, 6H), 5.33 (d, J=13.5 Hz, 1H), 0.97 (s, 27H), 0.18 (s, 18H).

Example 2: Synthesis of TPC-OSO$_2$F

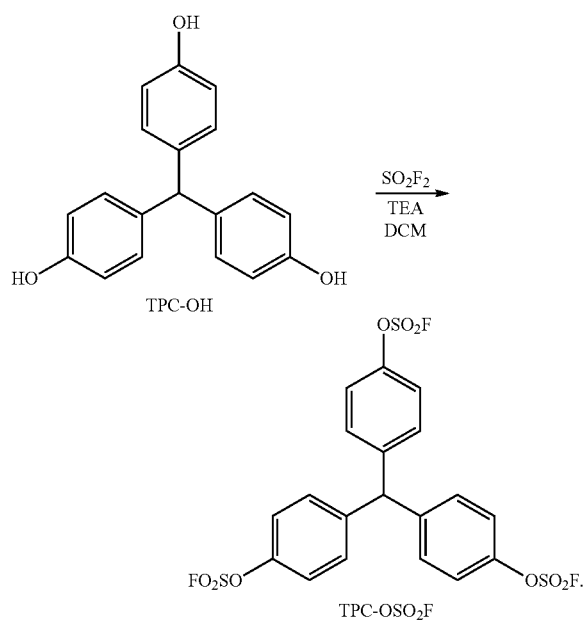

Figure 2:
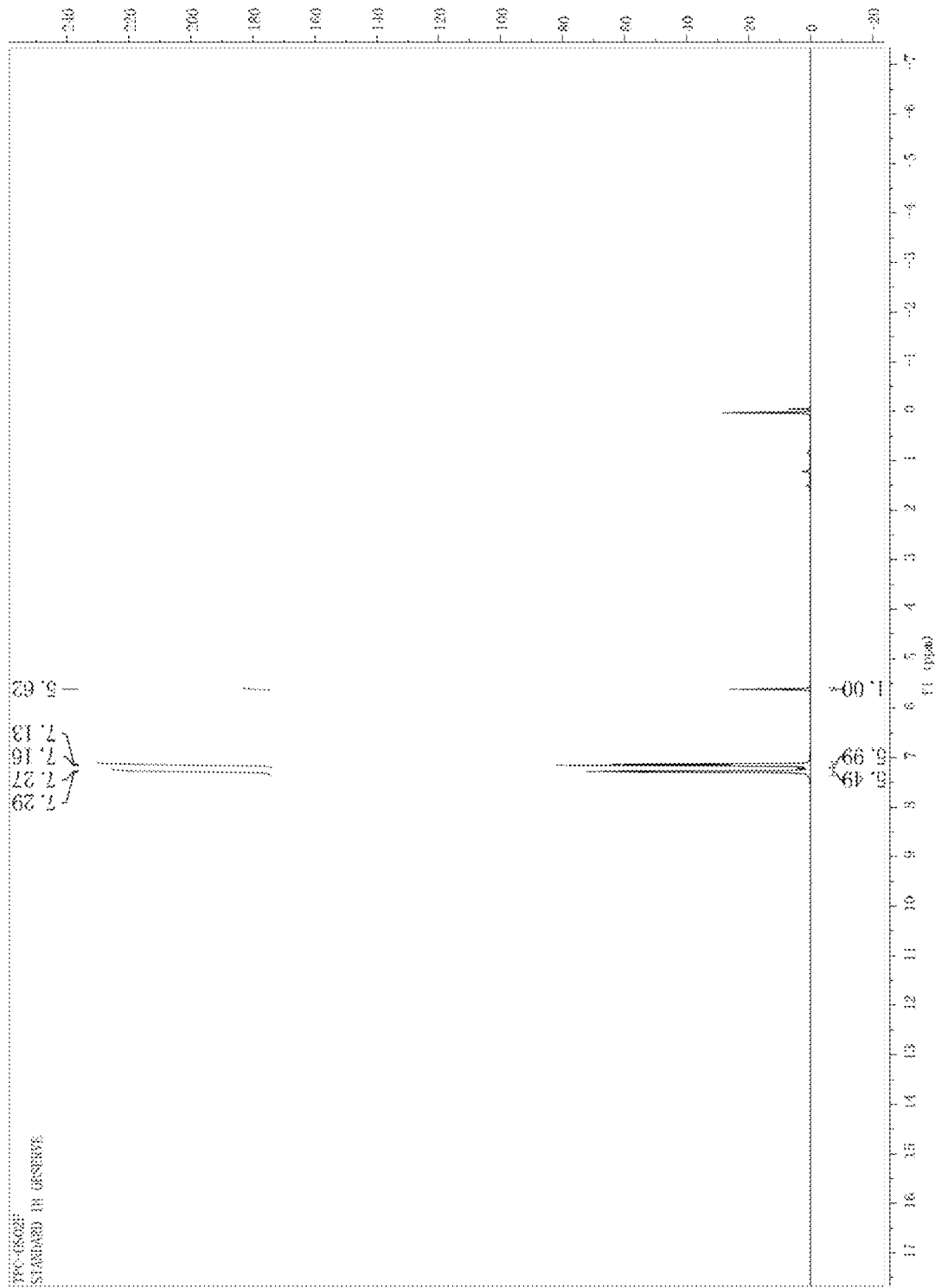
FIG. 2 shows the nuclear magnetic spectrum of TPC-OSO$_2$F.

4,4',4"-trihydroxytriphenylmethane (1.46 g, 5 mmol) was placed in a 1000 mL flask, 20 mL of dichloromethane was added, reaction mixture was stirred at room temperature, triethylamine (2.1 g, 20 mmol) was added, and the mixture was stirred continuously to dissolve all the solids. The flask was sealed, pumped to vacuum with a water pump, and then a 55 L air bag was used to introduce sulfuryl fluoride gas. The entire reaction system was kept sealed and the reaction was continued to stir at room temperature for 12 hours. The reaction progress was monitored by TLC. After starting raw materials were converted, the solid was removed by filtration. The filtrate was spin-dried and the crude product was purified by column chromatography. The developing solvent was ethyl acetate/petroleum ether (v/v=1/4). The pure product was white fine crystal (2.5 g, yield: 93%) TPC-OSO$_2$F. The nuclear magnetic spectrum of the synthesized product is shown in FIG. 2. $^1$H NMR (400 MHz, CDCl$_3$, ppm) δ 7.28 (d, J=8.6 Hz, 6H), 7.16 (d, J=8.7 Hz, 6H), 5.31 (s, 1H).

Example 3: Synthesis of TPC-cPS-gel

Figure 3:
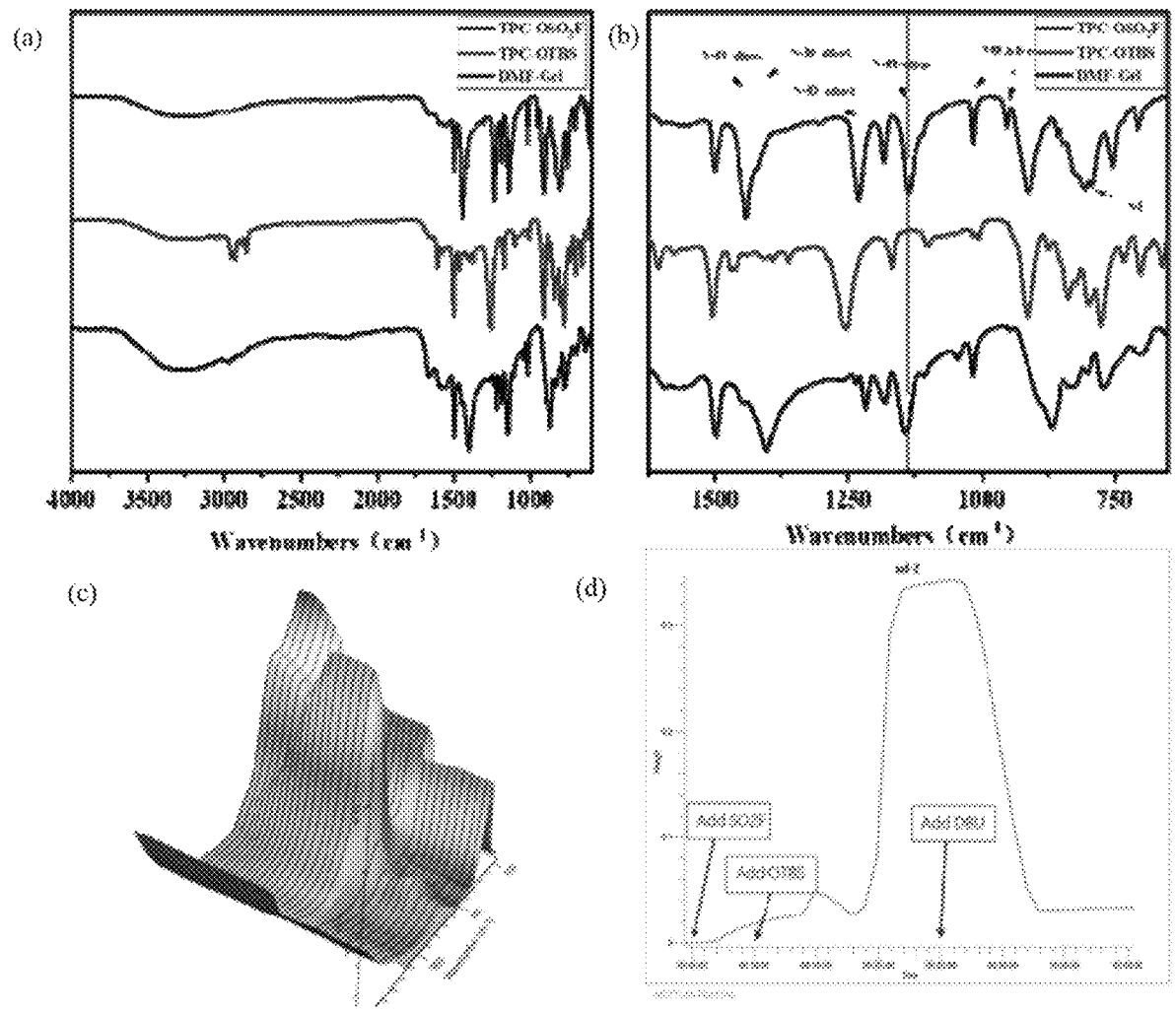
FIG. 3 shows the FT-IR of TPC-OSO$_2$F, TPC-OTBS, TPC-cPS-Gel, FIG. 3a, FIG. 3b; in situ infrared spectra of TPC-cPS-Gel, FIG. 3c, FIG. 3d.

At room temperature, equal molar amounts of TPC-OSO$_2$F (200 mg) and TPC-OTBS (235 mg) were weighted and added to a 20 mL flask. 4 mL of DMF was added to the flask as solvent with a pipette. All solids were dissolved by sonication, and then 50 ug of DBU was added. The mixture was sonicated again to dissolve and disperse evenly. The mixture was stood for 24 hours, pouring off the upper layer of liquid, and removing the gel layer, which is colorless TPC-cPS-gel, not settling when subjecting to gel centrifugation. FIG. 3 shows the FT-IR of TPC-OSO$_2$F, TPC-OTBS, TPC-cPS-Gel, FIG. 3a, FIG. 3b. In situ infrared spectra of TPC-cPS-Gel are FIG. 3c, FIG. 3d. Two characteristic stretches were observed at 1437 cm$^{-1}$ and 1219 cm$^{-1}$, which corresponded to the S=O symmetrical and asymmetric stretching vibration peaks, respectively, and the absorption peaks at 1012 cm$^{-1}$ and 940 cm$^{-1}$ were the stretches of S—O. The stretched peak at 816 cm$^{-1}$ was attributed to the stretching vibration of S—F. After the addition of DBU to catalyze the formation of the gel, a new peak was observed at 1380 cm$^{-1}$, which was consistent with the sulfonic acid salt formed during the reaction process. The peak at 816 cm$^{-1}$ disappeared at the same time, confirming the occurrence of the sulfur-fluorine exchange reaction, which was consistent with the fluorine on the material surface observed by electron dispersive X-ray spectroscopy. In addition, in situ infrared was used to explore the changes in the system. First, 200 mg of TPC-OSO$_2$F was weighed and dissolved in 4 ml of DMF to reach a steady state. After 10 minutes, an equimolar amount of TPC-OTBS monomer as TPC-OSO$_2$F was added. As shown in FIGS. 3(c-d), a new characteristic peak appeared rapidly around 917 cm$^{-1}$. After stirring to make the starting materials reach a steady state, 50 ug DBU was added as a catalyst at 25 min, and the characteristic peak at 917 cm$^{-1}$ decreased rapidly within 5 min, and a new peak appeared at 875 cm$^{-1}$, which was attributed to the cleavage of the Si—O bond and the formation of sulfonate. It was consistent with the information obtained by FT-IR, which can be used to determine the beginning of the sulfur-fluorine exchange reaction and the formation of cross-linked polymers.

Figure 4:
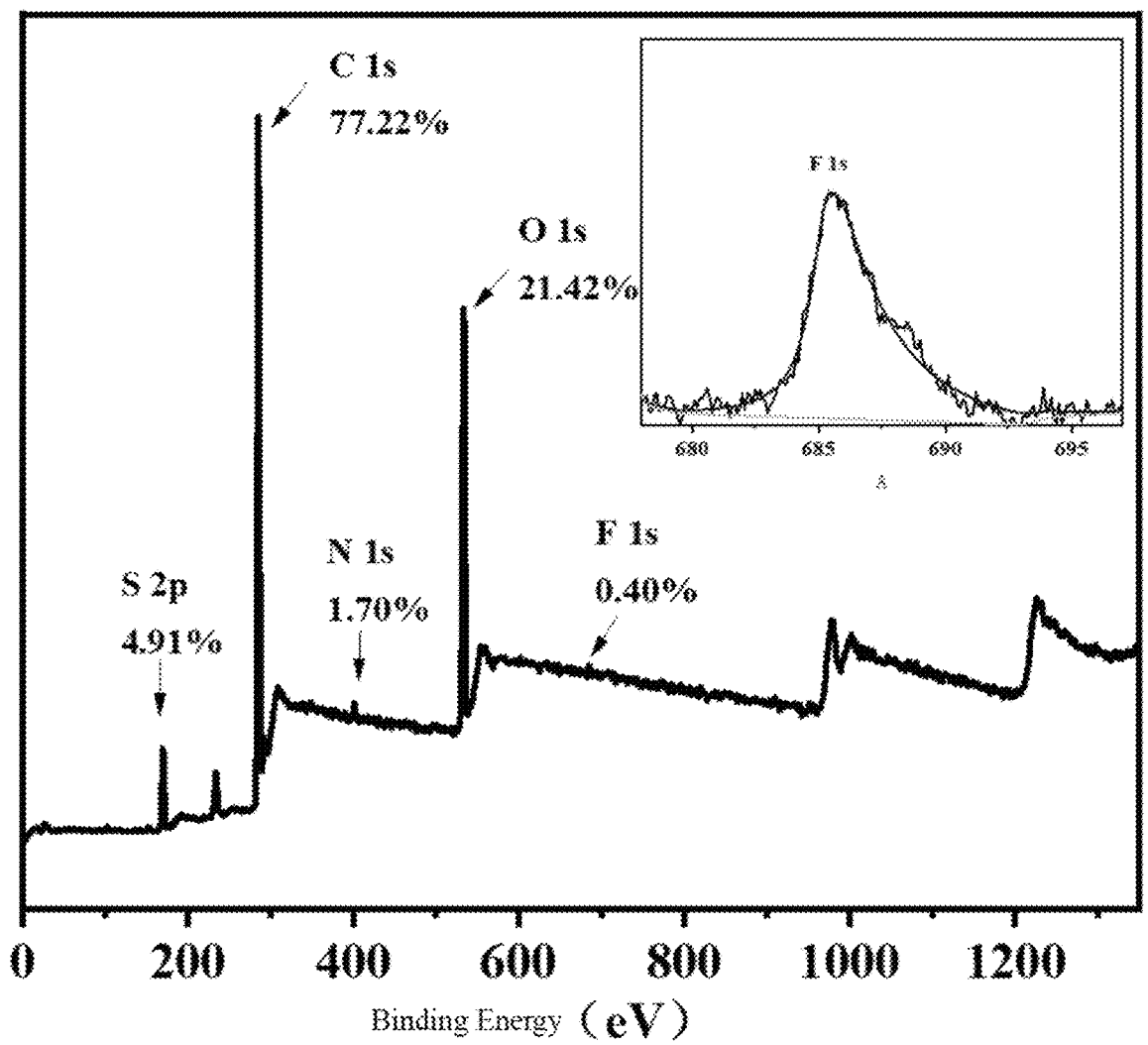
FIG. 4 shows the XPS diagram of TPC-cPS-Gel.

FIG. 4 shows the XPS diagram of the TPC-cPS-gel. XPS indicated that the gel formed using DMF as the reaction solvent was almost completely reacted (the fluorine content was 0.40%, which was considered to be completely reacted according to common definition).

Figure 5:
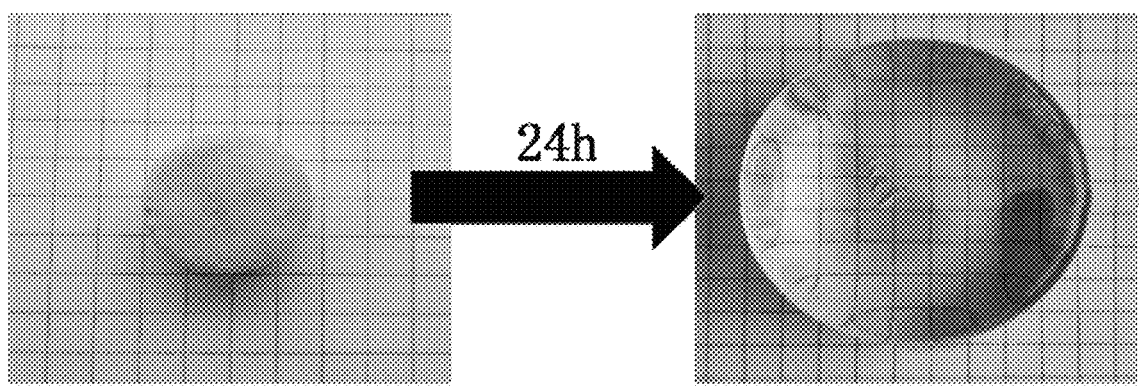
FIG. 5 shows the swelling change diagram of TPC-cPS-Gel in DMF.
Figure 6:
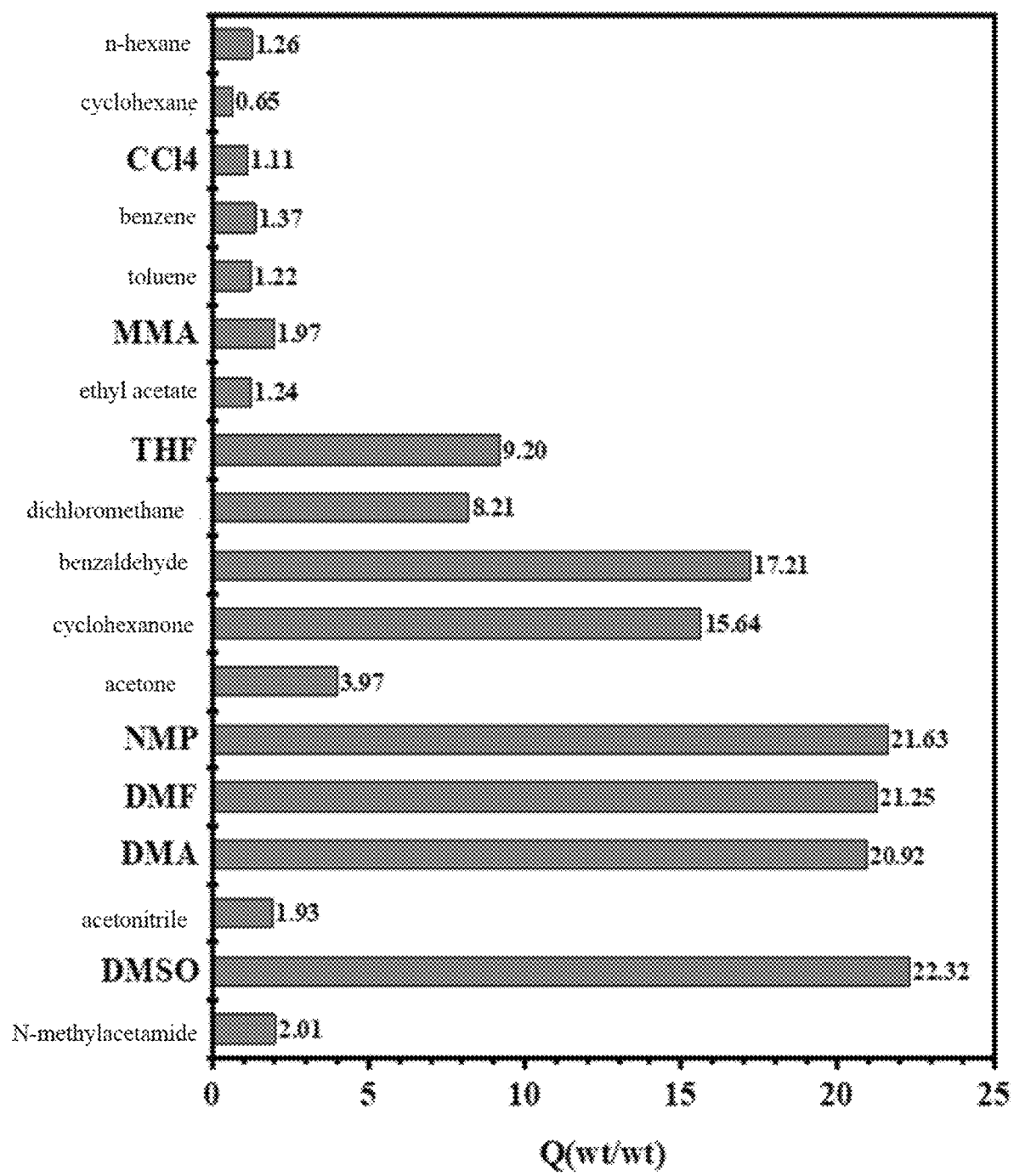
FIG. 6 shows the swelling degree (Q) of TPC-cPS-Gel in different organic solvents.
Figure 7:
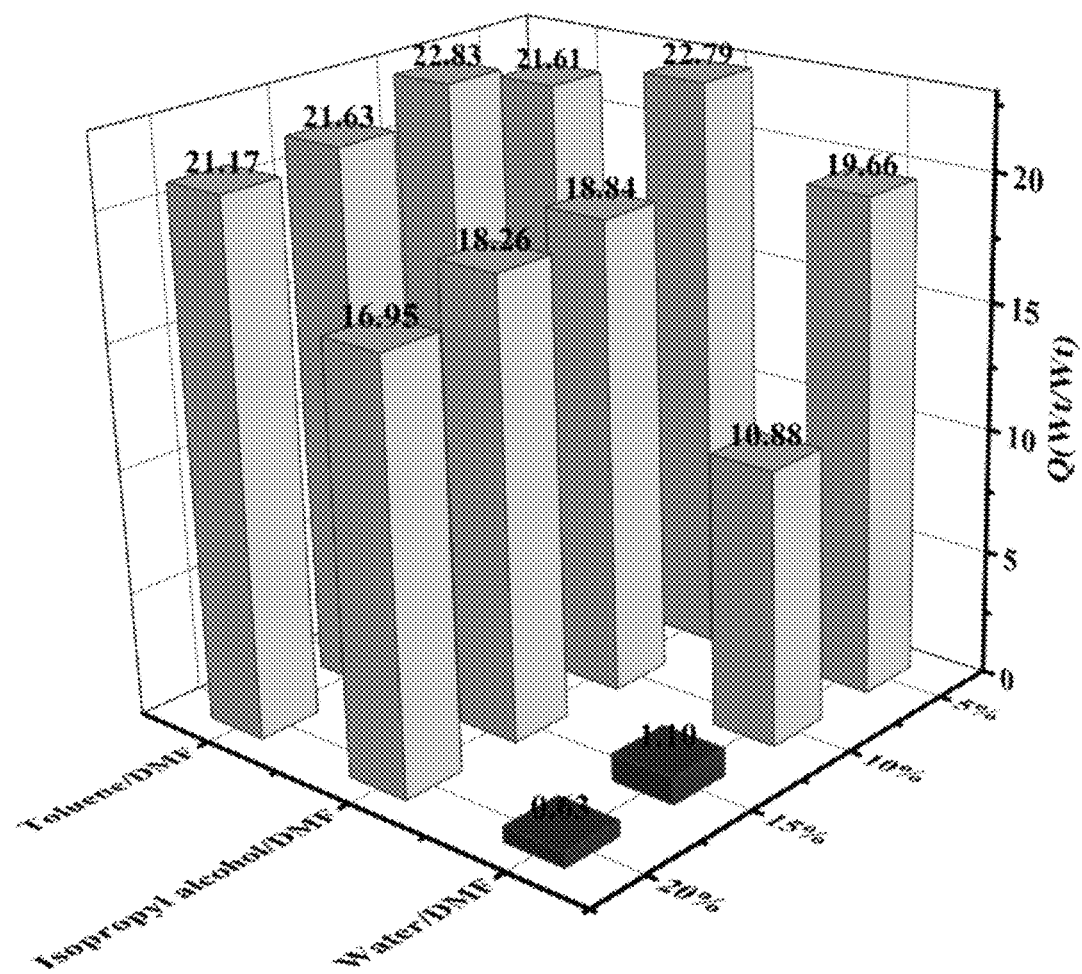
FIG. 7 shows the swelling degree (Q) of TPC-cPS-Gel in different mixed solvents.

The TPC-cPS-gel was added to DMF to study the adsorption performance. See FIG. 5, which shows a graph of the swelling change of TPC-cPS-Gel in DMF. In addition, the TPC-cPS-gel was added to other organic solvents or mixed solvents (toluene/DMF, isopropanol/DMF, water/DMF) to study the changes in adsorption performance. The results are shown in FIGS. 6 and 7.

Example 4

At room temperature, equimolar amounts of TPC-OSO$_2$F (400 mg) and TPC-OTBS (470 mg) were weighted and added into a 20 mL sample vial, using a pipette to measure 4 mL of DMF and adding it to the sample vial as a solvent, dissolving all the solids, then adding 50 ug of DBU, sonicating again to dissolve and dispersing evenly, letting the sample bottle stand for 24 hours, pouring off the upper layer of liquid, and removing the gel layer, which was 2-TPC-cPS-gel.

At room temperature, equimolar amounts of TPC-OSO$_2$F (800 mg) and TPC-OTBS (940 mg) were weighted and added into a 20 mL sample vial, using a pipette to measure 4 mL of DMF and adding it to the sample vial as a solvent, dissolving all the solids, then adding 50 ug of DBU, sonicating again to dissolve and dispersing evenly, letting the sample bottle stand for 24 hours, pouring off the upper layer of liquid, and removing the gel layer, which was 4-TPC-cPS-gel.

Figure 8:
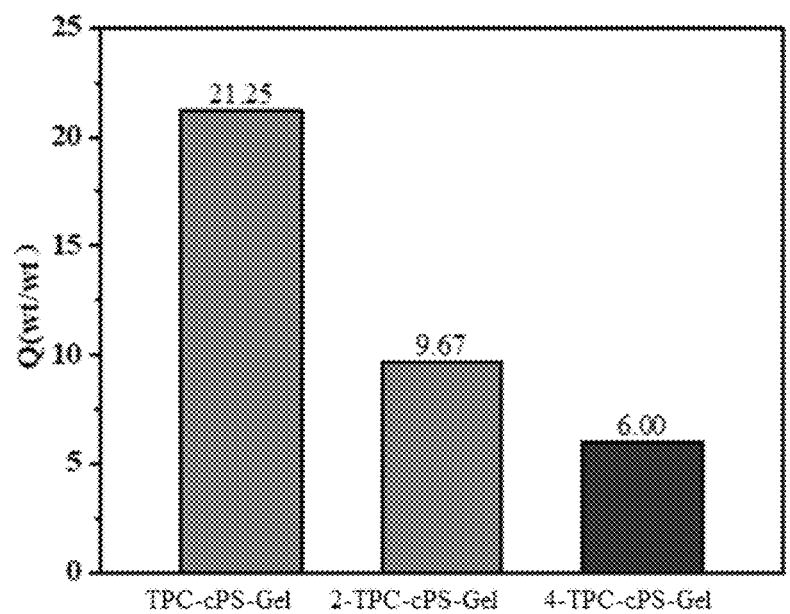
FIG. 8 shows the swelling degree of TPC-cPS-Gel prepared in different concentrations in DMF.

The TPC-cPS-gel was added to DMF to study the adsorption performance, see FIG. 8.

Example 5

At room temperature, equimolar amounts of TPC-OSO$_2$F (200 mg) and TPC-OTBS (235 mg) were weighted and added into a 20 mL sample vial, using a pipette to measure 4 mL of DMF into the sample vial as a solvent, dissolving all the solids, adding 50 ug of DBU, sonicating again to dissolve and disperse evenly, leaving the sample vial at 40° C. for 24 hours, pouring off the upper layer of liquid, and removing the lower layer of gel, which was TPC-cPS-gel-40.

At room temperature, equimolar amounts of TPC-OSO$_2$F (200 mg) and TPC-OTBS (235 mg) were weighed and added into a 20 mL sample vial, using a pipette to measure 4 mL of DMF into the sample vial as a solvent, dissolving all the solids, adding 50 ug of DBU, sonicating again to dissolve and disperse evenly, leaving the sample vial at 80° C. for 24 hours, cooling to room temperature naturally, pouring off the upper layer of liquid, and removing the lower layer of gel, which was TPC-cPS-gel-80.

At room temperature, equimolar amounts of TPC-OSO$_2$F (200 mg) and TPC-OTBS (235 mg) were weighed and added into a 20 mL sample vial, using a pipette to measure 4 mL of DMF into the sample vial as a solvent, dissolving all the solids, adding 50 ug of DBU, sonicating again to dissolve and disperse evenly, leaving the sample vial at 120° C. for 24 hours, cooling to room temperature naturally, pouring off the upper layer of liquid, and removing the lower layer of gel, which was TPC-cPS-gel-120.

Figure 9:
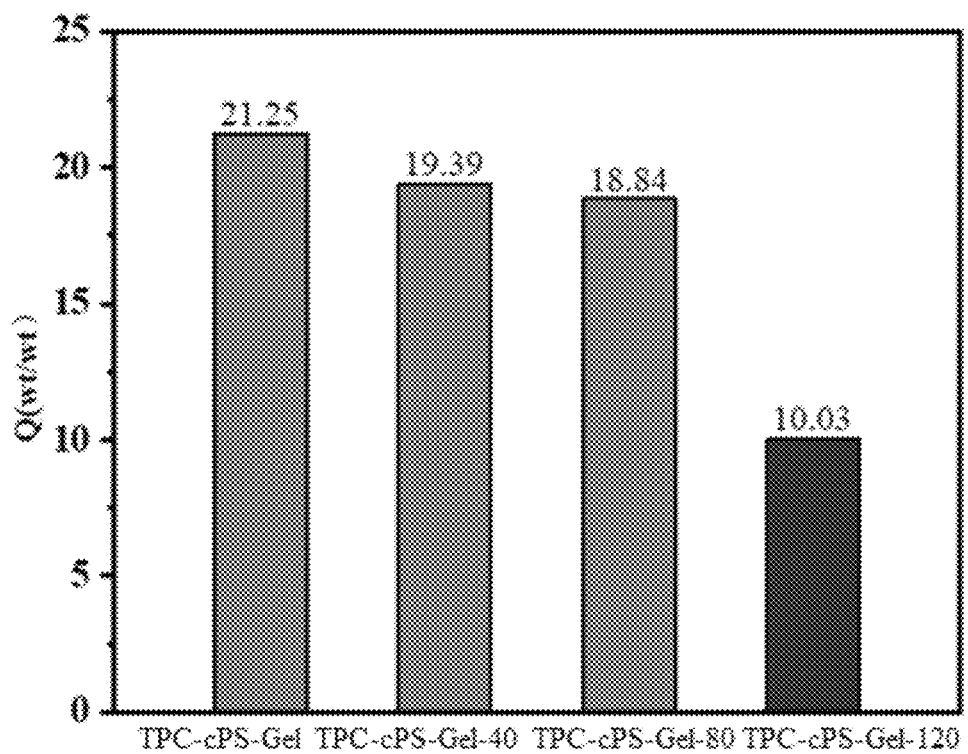
FIG. 9 shows the swelling degree of TPC-cPS-Gel prepared at different temperatures in DMF.

The above TPC-cPS-gel was added to DMF to study the adsorption performance, see FIG. 9.

Example 6

At room temperature, equimolar amounts of TPC-OSO$_2$F (200 mg) and TPC-OTBS (235 mg) were weighed and added into a 20 mL sample vial, using a pipette to measure 4 mL of DMSO into the sample vial as a solvent, dissolving all the solids, adding 50 ug of DBU, sonicating again to dissolve and disperse evenly, letting the sample bottle stand for 24 hours, pouring off the upper layer of liquid, and removing the lower layer of gel, which was TPC-cPS-gel-DMSO.

At room temperature, equimolar amounts of TPC-OSO$_2$F (200 mg) and TPC-OTBS (235 mg) were weighed and added into a 20 mL sample vial, using a pipette to measure 4 mL of CH$_2$Cl$_2$ into the sample vial as a solvent, dissolving all the solids, adding 50 ug of DBU, sonicating again to dissolve and disperse evenly, letting the sample bottle stand for 24 hours, pouring off the upper layer of liquid, and removing the lower layer of gel, which was TPC-cPS-gel-CH$_2$Cl$_2$.

Figure 10:
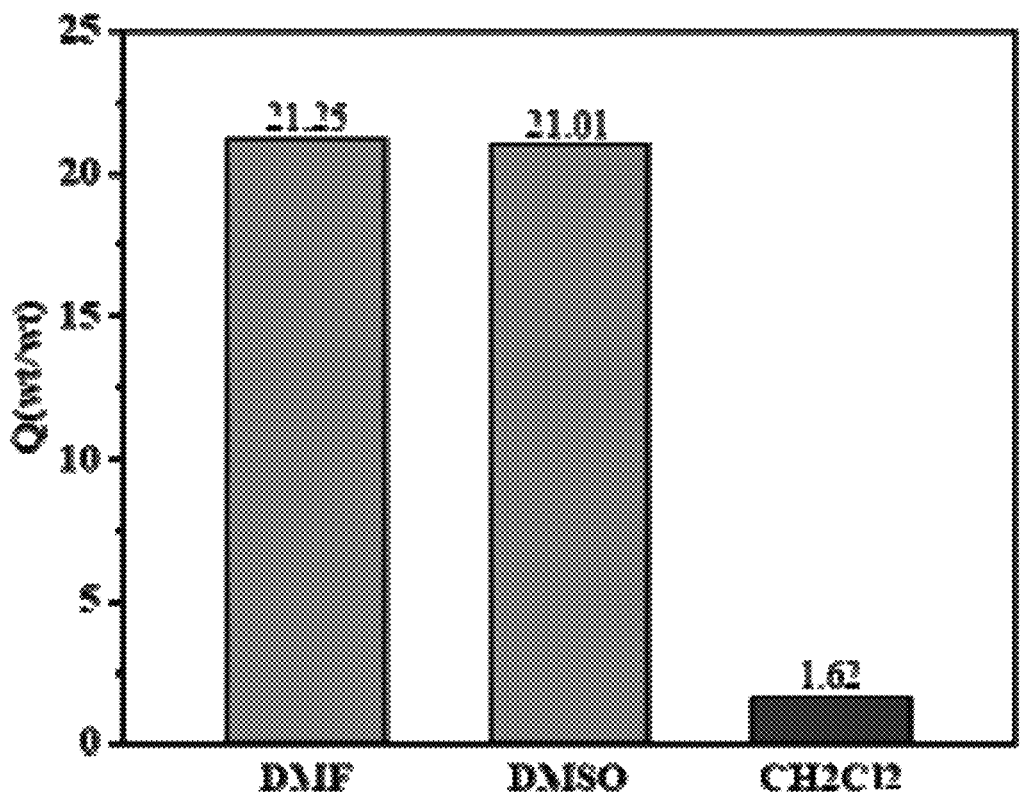
FIG. 10 shows the swelling degree of TPC-cPS-Gel prepared in different solvents in DMF.

The above TPC-cPS-gel was added to DMF to study the adsorption performance. See FIG. 10.

Figure 11:
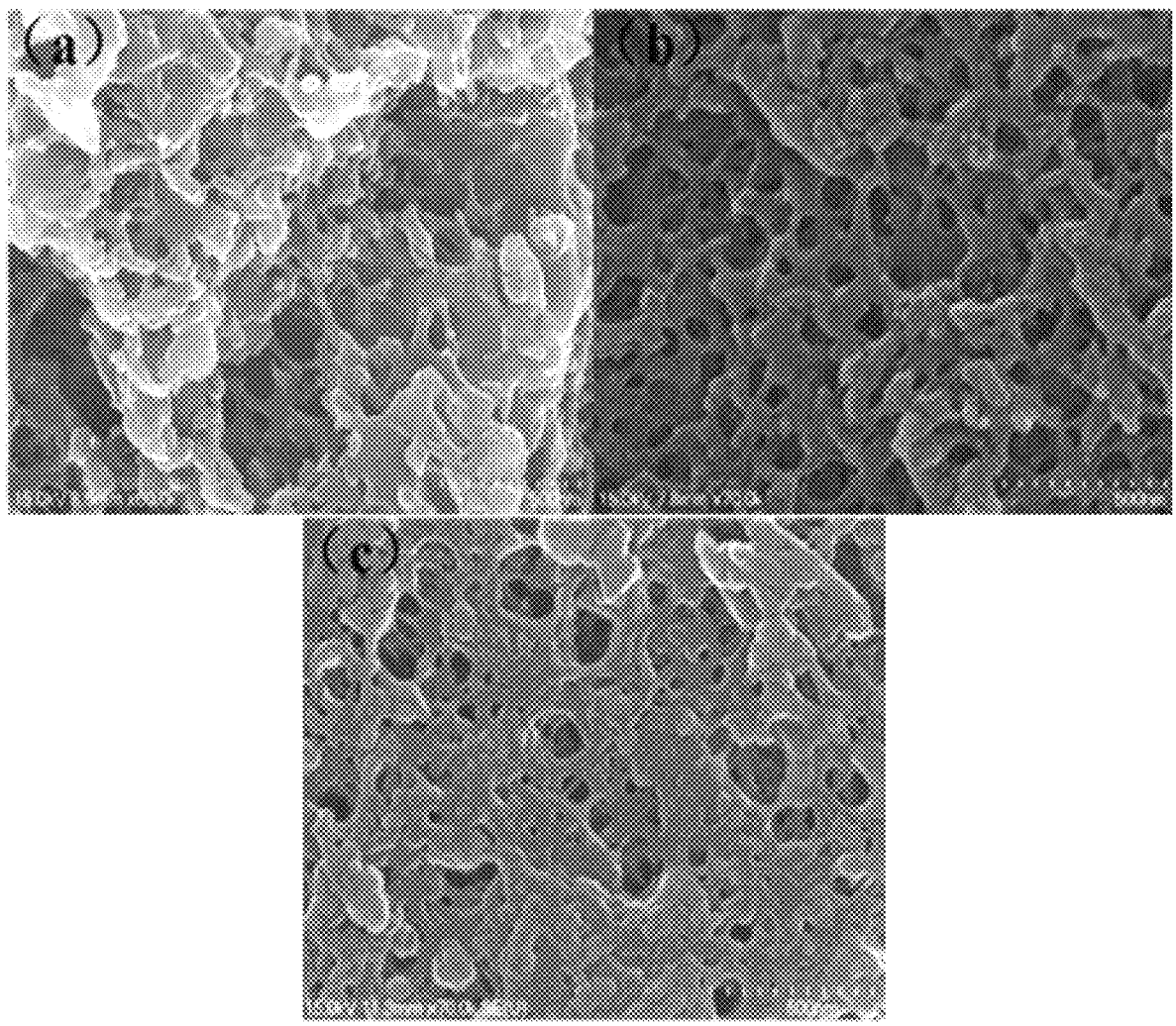
FIG. 11 shows the SEM images of TPC-cPS-Gel prepared in different solvents, a being DMF, b being DMSO, and c being CH$_2$Cl$_2$.

FIG. 11 shows the SEM images of gels formed by different solvents. The morphology of the gel prepared with DMF and DMSO as solvents had a good pore size distribution, while the morphology of the gel prepared in CH$_2$Cl$_2$ was relatively disordered.

In addition, XPS indicated that the gel formed using DMF as the reaction solvent was almost completely reacted (the fluorine content was 0.40%), the fluorine content of the gel formed by DMSO as the reaction solvent was 0.63%, and the gel formed in CH$_2$Cl$_2$ contained 0.63% fluorine. The highest amount of fluorine was 2.19%, and there was organic fluorine on unreacted —OSO$_2$F.

Further, other monomers were studied, and equimolar amounts of monomer A (200 mg) and monomer B were weighed into a 20 mL sample bottle, and 4 mL of DMF was measured with a pipette and added to the sample bottle as a solvent. All solids were dissolved by conventional sonication, then 50 ug of DBU was added, sonicated again to dissolve and disperse uniformly, and the vial was allowed to stand, but no gel was formed.

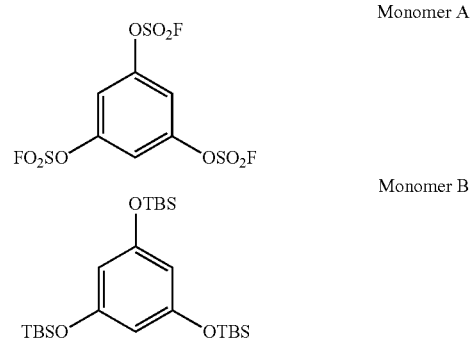

The present invention introduces polar sulfate bond into the polymer system, and this reaction has no metal ion introduction, mild reaction, high yield and few by-products, and is suitable for future industrialization research. Specifically, multi-functional group (number of functional groups=3) monomers are used to prepare gel-type cross-linked polysulfate without cross-linking agent. The three-dimensional structure of 4,4',4''-trihydroxytriphenyl-methane (TPC-OH) is first selected. As phenolic precursors, sulfuryl fluoride and siloxane etherification were used to form trifunctional monomers TPC-OTBS and TPC-OSO$_2$F; these two monomers were dissolved in organic solvent DMF, mixed uniformly, and then added DBU acts as a catalyst, standing at room temperature, and the solvent viscosity gradually increases to form a full gel; it has excellent adsorption capacity (>20 times) for organic solvents such as DMF.

The invention claimed is:

1. A method of preparing TPC-OTBS or TPC-OSO$_2$F:

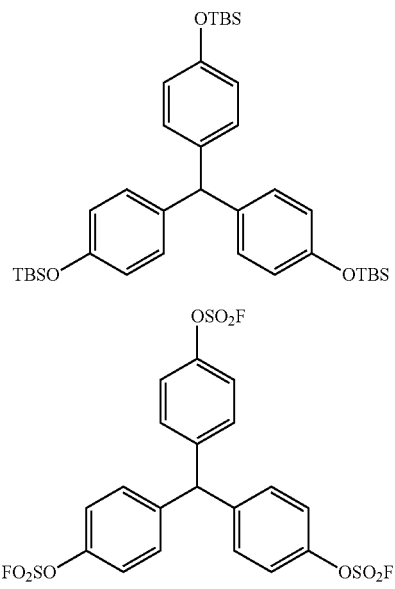

TPC-OTBS

TPC-OSO$_2$F comprising:
in the presence of imidazole, reacting 4,4',4"-trihydroxytriphenylmethane with tert-butyldimethylchlorosilane to prepare the TPC-OTBS; or
in the presence of triethylamine, reacting 4,4',4"-trihydroxytriphenylmethane with sulfuryl fluoride to prepare the TPC-OSO$_2$F.

2. The method according to claim 1, wherein a molar ratio of 4,4',4"-trihydroxytriphenylmethane, tert-butyldimethylsilyl chloride and imidazole is 1:(3-4):(3-4); a molar ratio of 4,4',4"-trihydroxytriphenylmethane and triethylamine is 1:(3-4); and the reaction of 4"-trihydroxytriphenylmethane and tert-butyldimethylchlorosilane and the reaction of, 4',4"-trihydroxytriphenylmethane and sulfuryl fluoride are carried out at room temperature.

3. The method according to claim 1, further comprising the step of preparing a polymer gel by dissolving TPC-OTBS and TPC-OSO$_2$F in dimethylformamide to form a mixture; adding 1,8-diazabicyclo(5.4.0)undec-7-ene to the mixture as a catalyst; and letting the mixture to react at room temperature to obtain a polymer gel.

4. The method according to claim 3, wherein a ratio of TPC-OSO$_2$F, DMF and DBU is (190-210 mg):(1-4.5 mL):50 µg; and a molar ratio of TPC-OSO$_2$F and TPC-OTBS is 1:(0.9-1.1).

5. The method according to claim 4, wherein the molar ratio of TPC-OSO$_2$F and TPC-OTBS is 1:1.

* * * * *